Oct. 4, 1966  H. E. SHAW, JR  3,276,813
GLARE SHIELDING AND INSTRUMENT VIEWING ARRANGEMENT
Filed July 14, 1964  2 Sheets-Sheet 1
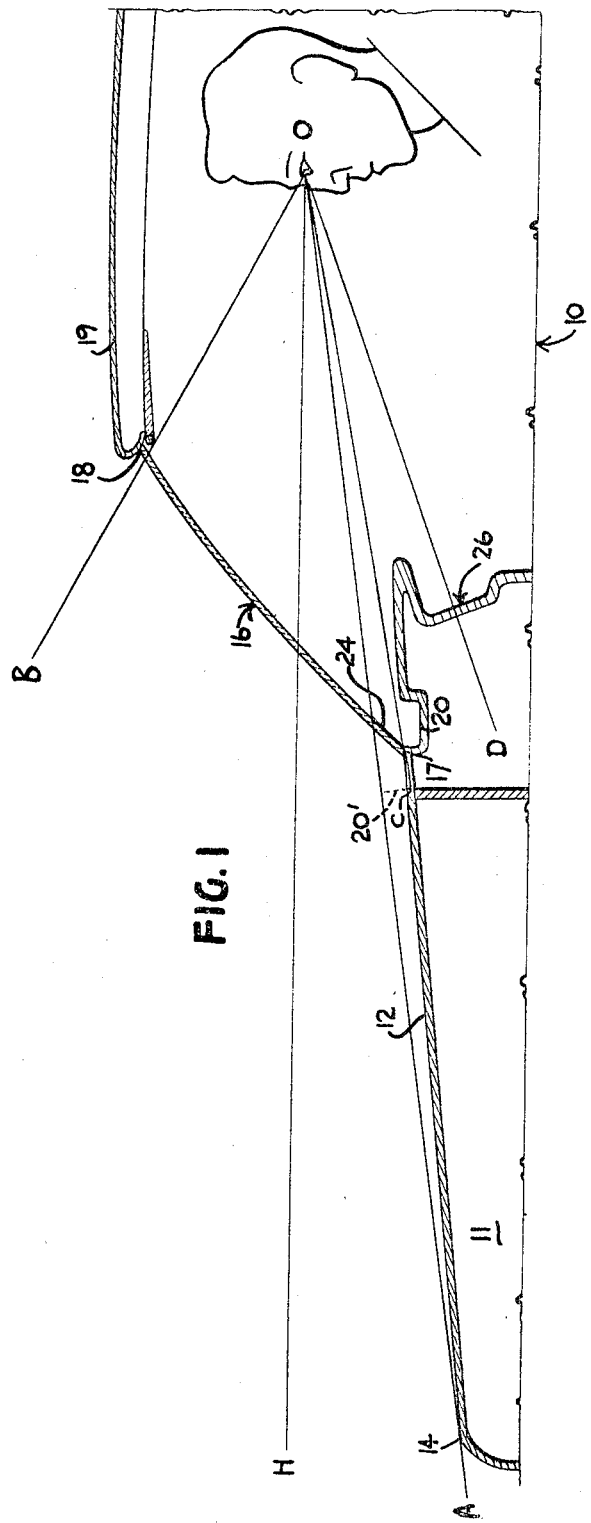
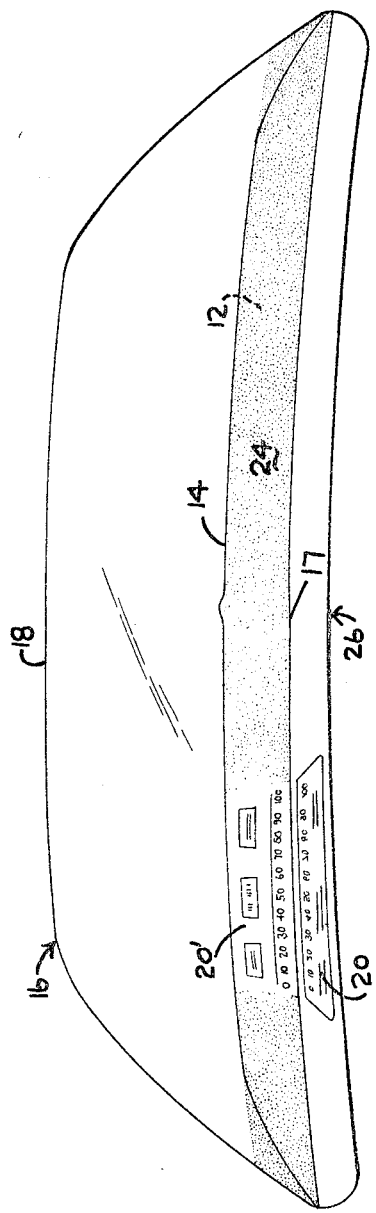
INVENTOR.
HUGH E. SHAW JR.
BY Chisholm and Spencer
ATTORNEYS Oct. 4, 1966     H. E. SHAW, JR     3,276,813
GLARE SHIELDING AND INSTRUMENT VIEWING ARRANGEMENT
Filed July 14, 1964     2 Sheets-Sheet 2
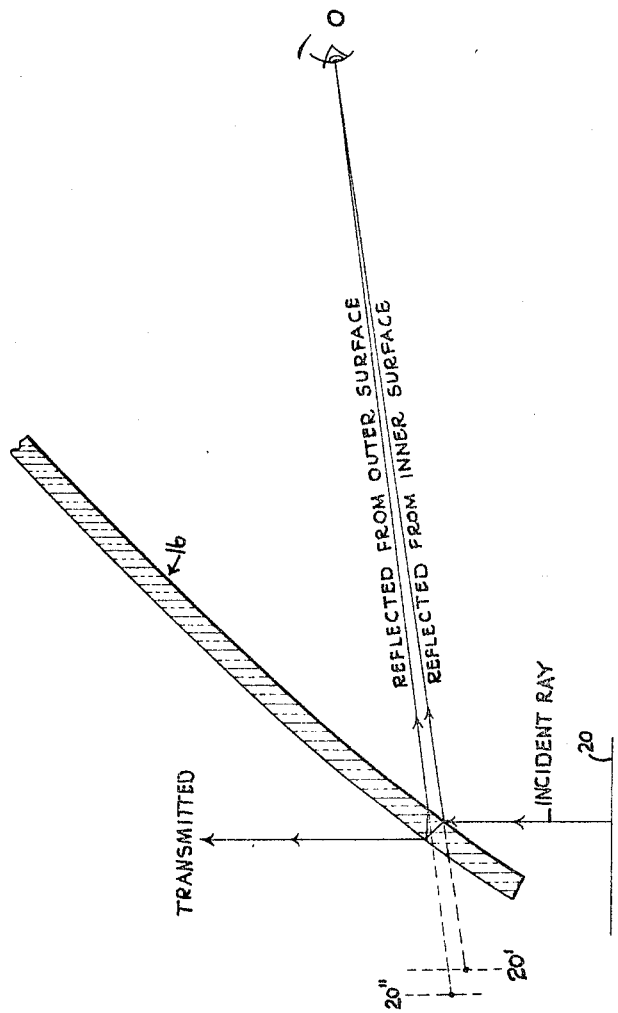
INVENTOR.
HUGH E. SHAW JR.
BY *Chisholm and Spencer*
ATTORNEYS

# United States Patent Office 3,276,813
Patented Oct. 4, 1966

1

3,276,813
GLARE SHIELDING AND INSTRUMENT
VIEWING ARRANGEMENT
Hugh E. Shaw, Jr., New Kensington, Pa., assignor to Pittsburgh Plate Glass Company, Pittsburgh, Pa., a corporation of Pennsylvania
Filed July 14, 1964, Ser. No. 382,535
4 Claims. (Cl. 296—97)

This invention relates generally to motor vehicle equipment. In particular, the invention is directed to improving the ability of a driver of a vehicle to observe an instrument panel without taking his eyes off the road and without introducing distractions into his field of view.

Presently, the speedometer of motor vehicles is mounted behind an instrument panel and is read through a window in the panel. It is necessary for a motor vehicle driver to glance down away from the road to read the instrument panel including the speedometer. Thus, every time a driver gazes at the instrument panel he must look away from the highway ahead. This glancing away from the road may cause accidents, particularly when travelling at high speeds.

It has been suggested to provide a motor vehicle speedometer and instrument panel so arranged and mounted that the driver can continuously observe the vehicle speed without looking away from the road. According to a typical prior art structure, numerals representing the vehicle speed are projected as transparent images onto a windshield directly in front of the driver by means of reflective light. While the driver need not turn away from the road to determine his vehicle speed, it has been observed that a continual image of varying transparent numbers appearing in the field of vision has a tendency to distract the driver and even cause headaches and eye strain.

The present invention makes it possible for the vehicle driver to view both the road and the readings on the instrument panel without necessitating his taking his eyes off the road. In addition, the present invention enables the maximum use of glass in accordance with the desires of automotive stylists without subjecting the driver and other occupants of the vehicle, particularly those in the front seat, to glare caused by reflection of light onto the eye of the observer from the top surface of the hood of the vehicle.

The present invention will be understood more clearly in the light of a description of a specific embodiment thereof which follows:

In the drawings, wherein like reference characters refer to similar structural elements, FIG. 1 is a longitudinal sectional view of a portion of an automobile showing the position of a driver relative to the automobile windshield, its conventional instrument panel and dashboard, and including an illustrative embodiment of the present invention with details of automobile structure not essential to understanding the present invention omitted for clarity;

FIG. 2 is a perspective view from the driver's position through a windshield modified according to the present invention, showing its relationship to the hood of an automobile; and FIG. 3 is a schematic optical analysis demonstrating a benefit of the present invention.

Referring to the drawings, reference number 10 refers generally to an automobile vehicle. The automobile hood 11 has a top surface 12. The front end 14 of the hood 11 is seen through the windshield 16.

2

The windshield 16 is mounted with its lower edge 17 extending across the vehicle behind its hood 11 and its upper edge 18 engaging the roof 19 of the motor vehicle. The windshield is tilted obliquely upward and rearward from its lower edge 17, as seen in FIG. 1.

A recessed instrument panel 20 is mounted in facing relation to the lower portion of the windshield 16 and at an angle thereto. A coating 24 having high reflectivity and considerable absorptivity to light extends upward from the bottom edge 17 along the entire length of the bottom portion of the tilted windshield 16, as shown in FIG. 2. The coating is preferably applied to the inner surface of the windshield to increase light reflectivity at the inner surface of the lower portion of the windshield for reasons to be explained later.

The field of vision through the windshield 16 normally includes the hood 11 and the road. Various lines of sight from the eye O of the driver have been included in FIG. 1 to help describe the present invention. Line OH is a horizontal line drawn from the driver's eyes and is the normal eye position while driving. Line OA is a line from the driver's eye O to the front end 14 of the hood 11. Line OB is formed from the eye O of the driver through the upper edge 18 of the windshield 16 that is mounted into the roof 19 of the vehicle and defines the upper limit of the driver's field of vision. Line OC extends from the driver's eye O to the bottom 17 of windshield 16. Line OD is an obliquely downward line of sight to the instrument panel 26 located in the position that was conventional prior to the present invention.

According to the present invention, the instrument panel 20 is recessed within the top surface of the dashboard 26 and is supported in a substantially horizontal plane below the windshield 16. Thus, the elongated windshield 16 which extends obliqely upward and rearward from its bottom portion 17 makes an acute angle with the instrument panel 20. The instrument panel indicia are reflected from the coated lower portion of the windshield 16 to the eye of the observer and form an image 20' that appears to emanate from a portion of the field of vision defined by angle AOC. The present invention suggests arranging the angle between the plane of the instrument panel and the rear surface of windshield 16 so that the portion of the field of vision occupied by the image 20' of the instrument panel coincides with that occupied by the top surface 12 of the hood 11.

The present invention also suggests that the coating of light reflecting material extend along the bottom portion of the elongated windshield 16 substantially coextensive in height with the portion of the field of vision through the windshield occupied by the hood. This height of coating protects the eyes of the occupants from glare reflected from the top 12 of the hood 11. The coating 24 also improves the visibility of the image 20' of the instrument panel 20 by providing a dark background for said image.

The use of the coating 24 increases the reflection of incident light rays from the instrument panel 20 at the inner surface of the windshield to the eye O of the driver compared to this amount reflected by an uncoated windshield. Part of the unreflected portion is absorbed by the coating 24. The remainder is either transmitted to the outer surface of the windshield or absorbed by the windshield. A part of the light transmitted through the windshield is reflected at the outer surface and retransmitted through the windshield and the coating. The following table compares the relative intensity of the primary image reflected at the inner surface of the windshield with the secondary image produced by reflection at the outer surface of the windshield.

TABLE
[Comparison of intensity of images]

| | Uncoated Windshield | Coated Windshield |
|---|---|---|
| Visible Light Transmissivity, percent | 75 | 30 |
| Incident Ray Intensity, percent | 100 | 100 |
| Reflectivity from Inner Surface (Primary Image), percent | 4 | 40 |
| Ray Reflected from Outer Surface and Transmitted Through Windshield (Secondary Image), percent | 2.3 | 0.4 |
| Ratio of Primary Image Intensity to Secondary Image Intensity | 1.7 | 100 |

The above results were obtained from windshields of soda-lime-silica glass of ¼ inch nominal thickness having an approximate composition consisting essentially of the following parts by weight: $SiO_2$, 71.47 percent; $Na_2O$, 13.11 percent; CaO, 11.67 percent; MgO, 2.40 percent; $Na_2SO_4$, 0.48 percent; NaCl, 0.12 percent; $Fe_2O_3$, 0.56 percent; and $Al_2O_3$, 0.19 percent. The glass had a reflectivity of 4 percent to air.

The coating for the coated windshield consisted essentially of about equal parts by weight of iron oxide and cobalt oxide having a thickness of about 50 millimicrons. The coating had a 40 percent reflectivity at its air interface and a 30 percent reflectivity to the glass of the windshield.

The secondary image 20'' was clearly visible and offset from the primary image 20' when the windshield was uncoated. Coating the bottom portion of the windshield increased the intensity of the primary image 20' while reducing the intensity of the secondary image 20'' to such an extent that to all intents and purposes the secondary image was invisible.

The image 20' of the instrument panel 20 is readily available closely adjacent to and immediately below the portion of the field of vision AOB of the road. The view of FIG. 2 shows how an image of the instrument panel 20' appears in the coated bottom portion 24 of the automobile windshield. FIG. 3 shows how a secondary image 20'' would appear in the absence of a coating 24.

According to a particular embodiment of the present invention, the instrument panel image 20' appears to be 38 inches from the eye O of the vehicle driver. In the previous construction, in which the instrument panel was at the inner vertical surface of the dashboard 26, the distance was approximately 28 inches. This increase in distance from the driver's eye to the indicia lessens the fatigue of the eye to accommodate between the instrument panel and the road.

Furthermore, a driver's eyes have to be lowered only 8 degrees from the horizontal line of sight to view the middle of the instrument panel image 20' produced according to the present invention. It is necessary to lower the eyes 20 degrees from the horizontal line of sight OH to the line of sight OD to the center of instrument panel 26 in use prior to the present invention.

The light reflecting film used for the coating 24 may be any well-known material that is adherent to glass and capable of reflecting light. However, it is preferable to have the coating applied to the inner surface of the windshield 16 and to utilize coatings containing cobalt oxide as an essential ingredient such as disclosed in U.S. Patent No. 3,078,693 to Lytle. Such a coating may be of uniform thickness or of tapering thickness decreasing in an upward direction from the bottom edge upward towards the uncoated portion. The coating may be applied either before the glass is bent, as depicted in U.S. Patent No. 3,078,693 to William O. Lytle, dated February 26, 1963, or the coating may be applied after the glass is bent, utilizing the teaching of U.S. Patent No. 3,021,227 of Ronald E. Richardson, dated February 13, 1962.

A particular embodiment of the present invention has been described for the purposes of illustration. Reference to the scope of the present invention may be obtained by studying the claimed subject matter which follows.

What is claimed is:

1. In a motor vehicle, in combination, a hood, a roof, an elongated windshield extending obliquely upward and rearward from said hood to said roof to provide a field of vision for an occupant of a front seat of said vehicle to said hood and a road, a coating of light reflecting material extending along substantially the entire length of the bottom portion of said elongated windshield, an instrument panel located below said windshield and extending at an angle to said windshield such that an image of said instrument panel is reflected from the bottom portion of said windshield toward the eyes of said occupant, said coating being substantially coextensive in height with the portion of said field of vision through said windshield occupied by said hood, whereby said coating protects the eyes of said occupant from reflected glare while providing an image of said instrument panel and the readings thereof closely adjacent to the portion of said field of vision occupied by said road.

2. The combination as in claim 1, wherein said coating is on the inner surface of said windshield.

3. The combination as in claim 1, wherein the height of said coating is substantially coextensive with the portion of the field of vision occupied by said image as well as by said hood.

4. The combination as in claim 1, wherein said coating decreases in thickness in an upward direction.

References Cited by the Examiner

UNITED STATES PATENTS

| | | | |
|---|---|---|---|
| 1,871,877 | 8/1932 | Buckman. | |
| 2,264,044 | 11/1941 | Lee. | |
| 2,641,159 | 6/1953 | Mihalakis | 116—116 X |
| 2,641,160 | 6/1953 | Mihalakis | 116—116 X |
| 3,042,445 | 7/1962 | Lamar | 296—97 |
| 3,078,693 | 2/1963 | Lytle | 117—66 |
| 3,180,309 | 4/1965 | Clason | 116—57 X |

BENJAMIN HERSH, *Primary Examiner.*

J. A. PEKAR, *Assistant Examiner.*